US006868498B1

(12) United States Patent
Katsikas

(10) Patent No.: US 6,868,498 B1
(45) Date of Patent: Mar. 15, 2005

(54) SYSTEM FOR ELIMINATING UNAUTHORIZED ELECTRONIC MAIL

(76) Inventor: Peter L. Katsikas, 2800 Woodlawn Dr., #245, Honolulu, HI (US) 96822

( * ) Notice: Subject to any disclaimer, the term of this patent is extended or adjusted under 35 U.S.C. 154(b) by 790 days.

(21) Appl. No.: 09/648,894

(22) Filed: Aug. 25, 2000

Related U.S. Application Data
(60) Provisional application No. 60/180,937, filed on Feb. 8, 2000, and provisional application No. 60/152,025, filed on Sep. 1, 1999.

(51) Int. Cl.[7] ............................................. G06F 11/30
(52) U.S. Cl. ....................... 713/201; 709/217; 345/752
(58) Field of Search ........................ 713/201; 709/206, 709/207

(56) References Cited

U.S. PATENT DOCUMENTS

| | | | |
|---|---|---|---|
| 5,930,479 A | | 7/1999 | Hall |
| 5,931,905 A | * | 8/1999 | Hashimoto et al. ......... 709/217 |
| 5,944,787 A | | 8/1999 | Zoken |
| 6,052,709 A | * | 4/2000 | Paul ........................... 709/202 |
| 6,073,142 A | | 6/2000 | Geiger et al. |
| 6,101,531 A | | 8/2000 | Eggleston et al. |
| 6,195,698 B1 | * | 2/2001 | Lillibridge et al. ......... 709/225 |

OTHER PUBLICATIONS

CVS.SOURCEFORGE.NET, "Spam Filtering ESMTP Demon", copyright notice dated 2000, publ. at http://cvs.sourceforge.net/viewscvs.py/clocc/clocc/src/donc/smtp.lisp?rev=1.4.
Bounce Spam Mail, from Albert Yale Software, dated 1997–2000.
CSM Internet Mail Scanner, from CSM–USA, Inc., dated 1999.
CyberSitter AntiSpam, from CyberSitter.com, distributed by Solid Oak Software, circa 1999–2000.

(List continued on next page.)

Primary Examiner—Ayaz Sheikh
Assistant Examiner—Brandon Hoffman
(74) Attorney, Agent, or Firm—Leighton K. Chong; Ostrager Chong Flaherty & Broitman (Hawaii)

(57) ABSTRACT

A system for eliminating unauthorized email sent to a user on a network employs an email-receiving server connected between the network and the user's email client for receiving email addressed to the user and rejecting those in which the sender address does not match any of sender addresses maintained on an "authorized senders" list (ASL list). The ASL lists are maintained by an ASL manager in an ASL database operable with a spam processor module. A redirector module rejects the email if, upon sending a request for validation to the spam processor module, the sender's address does not match any authorized sender address on the ASL list. Email rejected by the redirector module is redirected to a web-based messaging (WBM) module which sends a message to the sender to confirm that the sender is a legitimate sender of email to the intended recipient. If the sender logs on to confirm their status, the WBM module executes an interaction procedure which can only be performed by a human, in order to ensure that the confirmation procedure is not performed by a mechanical program. The ASL manager maintains the ASL lists based upon sender address data collected from various sources and analyses of various email usage factors, including sent email, received email, contact lists maintained by the user, user preference inputs, third party programs, etc.

20 Claims, 9 Drawing Sheets

OTHER PUBLICATIONS

DL MailFilter, from DeadLetter and Leem Han Cheong, dated Nov. 1999.
E–Mail Chompaer, from Lorenzo Pasqualis, dated 1996–97.
E–Mail Remover, from Victor Javier, Virtual Network, Inc., Singapore, dated Mar.–Jul. 1998, and 1999.
FlameThrower, from Eagle Research, Inc., dated 2000.
Interceptor, from Grok Development Ltd., dated 1999–2000.
JOC E–Mail Checker, from JOCSoft and Jose Olice Civit, dated 2000.
Lyris MailShield, from Lyris, undated.
Quickhead–E, from Danere Software Innovations, dated Mar. 2000.
Spam Attack Pro, circa 1996–97, from softwiz.com.
Spam Buster, from Contact Plus Corp., dated 2000.
SpamEater, from High Mountain Software, dated 1997–2000.
SpamKiller, from NovaSoft, dated 1997–2000.
BrightMail, from BrightMail, Inc., dated 2000.
Praetor, from Computer Mail Services, Inc., circa 1998–99.
"MsgTo.com Stops Spam Email", web page circa Nov. 19, 1999, from www.applesforheatlh.com.
"The Species Filter", by Rafe Needleman, ed., dated Aug. 6, 1999, from www.RedHerring.com.
Official Sep. 1999 AUP (Auto Update Program) v5.0 Build 447, Product Update Release, winserver.com.

* cited by examiner

SYSTEM FOR ELIMINATING UNAUTHORIZED ELECTRONIC MAIL

This U.S. Patent application claims the benefit of U.S. Provisional Application 60/152,025, filed Sep. 1, 1999, entitled "Unwanted Email Filtering System", and U.S. Provisional Application 60/180,937, filed on Feb. 8, 2000, entitled "Unwanted Email Filtering System", both by the same inventor.

FIELD OF THE INVENTION

This invention relates to a system for eliminating unwanted email, and particularly to one in which all email must be recognized as sent by an authorized sender in order to be accepted.

BACKGROUND OF THE INVENTION

Unwanted or unauthorized email is a significant bane for users on worldwide networks, such as the current public Internet. Once a person's email address becomes known in a network system, it can easily be replicated in computerized lists and passed on electronically to an unlimited number of parties who have not been authorized or invited to send email to the user. A user's electronic mailbox can become inundated with such unauthorized email. Unauthorized or unwanted email is referred to generically in the industry by the term "spam", although the term is not intended to be associated with or to disparage the popular canned meat product sold under the trademark "Spam" by Hormel Corp. The user may have an email address with a commercial information service provider (ISP) service which limits the amount of email that can be accepted and/or stored or which charges the user by the volume received. The user may also waste a significant amount of time opening and reviewing such unwanted email. Unauthorized email may also be sent by unscrupulous persons who may enclose a virus or noxious software agent in the email which can infect the user's computer system, or which can be used as an unauthorized point of entry into a local network system that handles the user's email.

Most, if not all, of the current software to control the receipt of spam is based upon the use of identifying lists of known spam sources or senders ("spammers"). Such conventional spam control software functions on the basis of receiving all email as authorized unless a sender is identified as being on the exclusion list and the email can be filtered out. This approach is only as good as the identifying list and cannot guarantee that the user will not receive spam. Spammer lists require frequent updating and must be distributed in a timely manner to all subscribers to the spam control software or service. Sophisticated spammers frequently change their source Internet address, and can defeat attempts to keep exclusion lists current. They can also route the unwanted email through the Internet servers of other parties so as to disguise the source of the emails through innocuous or popularly recognized names. A user's email address may also become known to large numbers of individuals in public chat rooms or on public bulletin boards. Unwanted email sent by individuals are not tracked on spammer lists, because the sending of email by individuals is technically not spamming.

SUMMARY OF THE INVENTION

Accordingly, it is a principal object of the present invention to provide a spam control system that cannot be defeated by spammers who frequently change their source addresses or disguise themselves by routing email through other servers, or by individuals who send email that are not invited or authorized by the user. It is a particular object of the invention that the system of the invention reject all email as unauthorized unless the sender is recognized as being on the user's acceptance list.

In accordance with the present invention, a system for eliminating unauthorized email sent to a user on a network comprises:

(a) an email client for allowing the user to receive email sent on the network addressed to a unique email address of the user, (b) an email-receiving server connected between the network and the email client for receiving email addressed to the unique email address of the user, said email-receiving server having an authorized senders list (ASL) module which maintains an ASL list of email addresses of external users authorized to send email to the user, and (c) an email rejection module operable with the ASL module for rejecting the receipt of email sent to the email address of the user if the email address of the sender is not one that is maintained on the ASL list for the user.

In a preferred embodiment, the system's ASL module includes an ASL database for storing ASL lists of authorized sender addresses for respective subscribers of the system, a spam processor module for checking the ASL lists for matches, and an ASL manager for creating, maintaining, and updating the ASL lists. A redirector module rejects email if, upon sending a request for validation to the spam processor module, the sender's address does not match any authorized sender address found on the ASL list. Email rejected by the redirector module is redirected to a web-based messaging (WBM) module which sends a message notifying the sender to confirm that the sender is a legitimate sender of email to the intended recipient. If the sender logs on to confirm their status, the WBM module executes an interaction procedure which can only be performed by a human, in order to ensure that the confirmation procedure is not performed by a mechanical program. The ASL manager maintains the ASL lists based upon sender address data collected from various sources and analyses of various email usage factors, including sent email, received email, contact lists maintained by the user, user preference inputs, third party programs, etc.

The invention also encompasses associated methods of performing the above functions, as well as related software components which enable these functions to be performed.

Other objects, features, and advantages of the present invention will be described in further detail below, with reference to the following drawings:

DETAILED DESCRIPTION OF INVENTION

In contrast to the known approaches of existing spam control methods of accepting all email unless listed on an exclusion list as unauthorized, the fundamental principle of the present invention is to reject all email unless listed on an inclusion list as authorized. In this manner, it is possible to filter out email that comes from unrecognized spammers as well as individuals who send email that is uninvited by the user. Unlike the known email filtering systems, the present invention does not attempt to filter out the unwanted email after it has been accepted. Rather, it outright rejects the email at the earliest entry level. Thus, the invention operates on the premise that all email will be treated as unauthorized unless the sender is found to be on an "authorized senders" list in order to be accepted by the user. This provides an inherently powerful and 100% effective spam control solution in an environment where spammers can instantaneously change their source address or apparent identity and individuals in public areas can obtain email addresses of other users and send them unwanted email.

The following is a detailed description of one preferred embodiment of a system for implementing the invention concept. In this embodiment, the spam control system intelligently formulates the "authorized senders" list based upon an ongoing analysis of the user's email usage, such as to whom and with what frequency sent email is addressed to other users, and through the gathering of high-level user contact data, such as a user's known contacts and associates identified on other lists or files maintained by the user which indicate persons considered as authorized. The "authorized senders" list may also be updated and manipulated by the user at any time to add or remove authorized senders. While this specific implementation is used, and certain components are provided and configured to be interoperable in the described ways, it is to be understood that the full scope of the invention is deemed to encompass many other suitable modifications and variations to the described guiding principles of the invention.

Figure 1A:
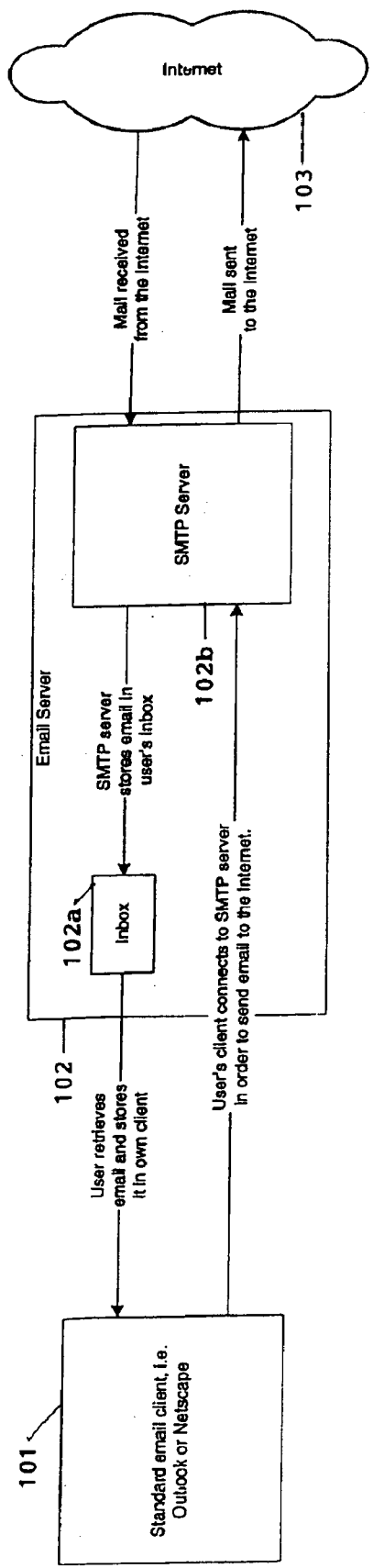
FIG. 1A is a block diagram illustrating a standard Internet email system using the conventional method for filtering email from spammers (Prior Art), as compared to FIG. 1B which shows a conceptual overview of a system in accordance with the present invention.

FIG. 1A is a block diagram of a standard email system for sending and receiving email on the Internet and is used to explain the conventional method for filtering out email from spammers. The system follows a standard industry protocol for handling email on the Internet, referred to as SMTP. Users typically subscribe with a chosen ISP for Internet access and related services, including email services. The users access the Internet through the ISP using a dialup or high-speed line connection and a standard browser. The browser includes or functions with a standard email client 101, such as the Outlook™ email client distributed by Microsoft Corp., headquartered in Bellevue, Wash., or the Netscape™ email client used by AOL/Netscape, headquartered in Fairfax, Va. The ISP operates at a website address corresponding to its is domain name which is addressable by users on the Internet. The ISP's service functions are performed for a large number of subscribers through one or more servers. Typically, an email server 102 is used to handle the email service functions. Email sent to the ISP from the Internet is received at SMTP Server 102b, where various administrative functions are performed, such as checking whether the addressee is an authorized subscriber of the ISP, then the email is placed in a storage space reserved for that user, referred to as Inbox 102a. When users connect to the ISP, they can retrieve their email and store it with their own email client (on their own computer). Users can send email by composing it locally at their email client, then uploading it to the SMTP Server 102b at the ISP, which then routes it to the recipient's email address on the Internet.

Conventional anti-spam control can be implemented with the SMTP Server and/or at the email client. Many ISPs implement an exclusion list of known spammers at the SMTP Server. In addition, they commonly allow a user to filter out unwanted email from certain senders known to the user. For example, the user's email client may have a filtering function that allows the user to input unwanted sender email addresses to the SMTP Server so that email received by the SMTP Server can be filtered out before being put into the user's Inbox. Further, independent software vendors sell sophisticated email handling programs that work with the user's email client. For example, some handling program have functions for categorizing received email into topical file folders, and email from unrecognized senders may be put into a "Miscellaneous" or "Unrecognized" file folder.

Figure 1B:
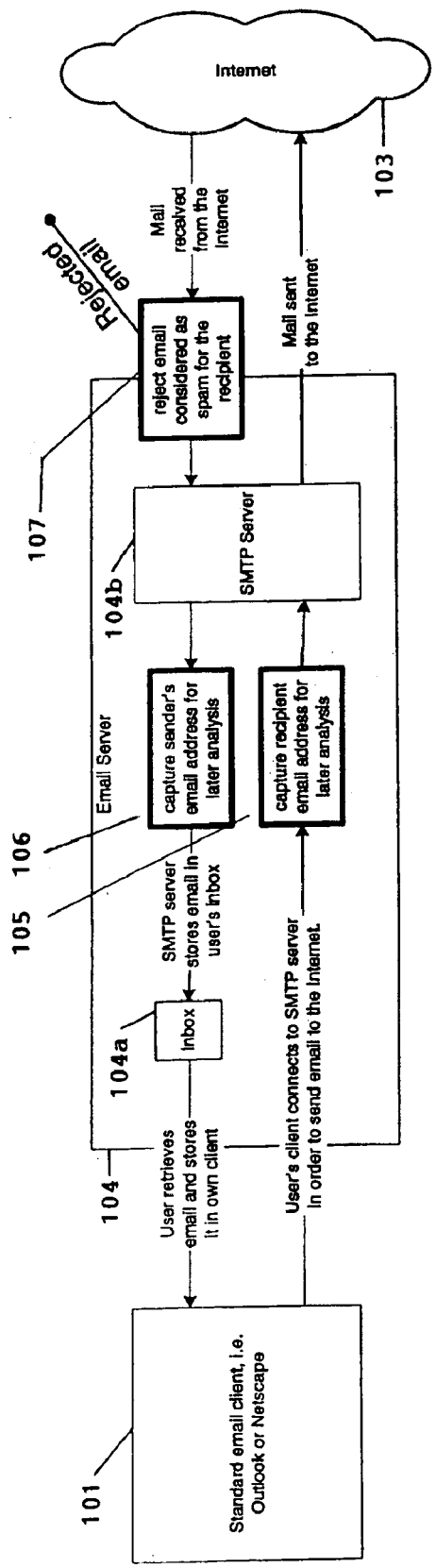

In FIG. 1B, a conceptual overview of a system in accordance with the present invention is shown. As before, the standard email client 101 is connected to an email server 104 for sending and receiving email to and from the Internet via SMTP Server 104b and Inbox 104a. However, in this modified email server 104, an Authorized Sender List (ASL) Manager captures receipient email addresses from email sent by the user, as shown at block 105, and also captures sender email addresses from email sent to the user, as shown at block 106. The ASL Manager analyzes the captured sender email addresses and recipient email addresses and employs certain predefined rules (described in further detail below) to add or remove email addresses from the "authorized senders" list, referred to as the ASL List or Database. The ASL List is used by the SMTP Server 104b to accept only email from senders on the ASL List and place the accepted email in the user's Inbox 104a, while rejecting all other email as "unauthorized", as indicated at block 107.

Figure 2:
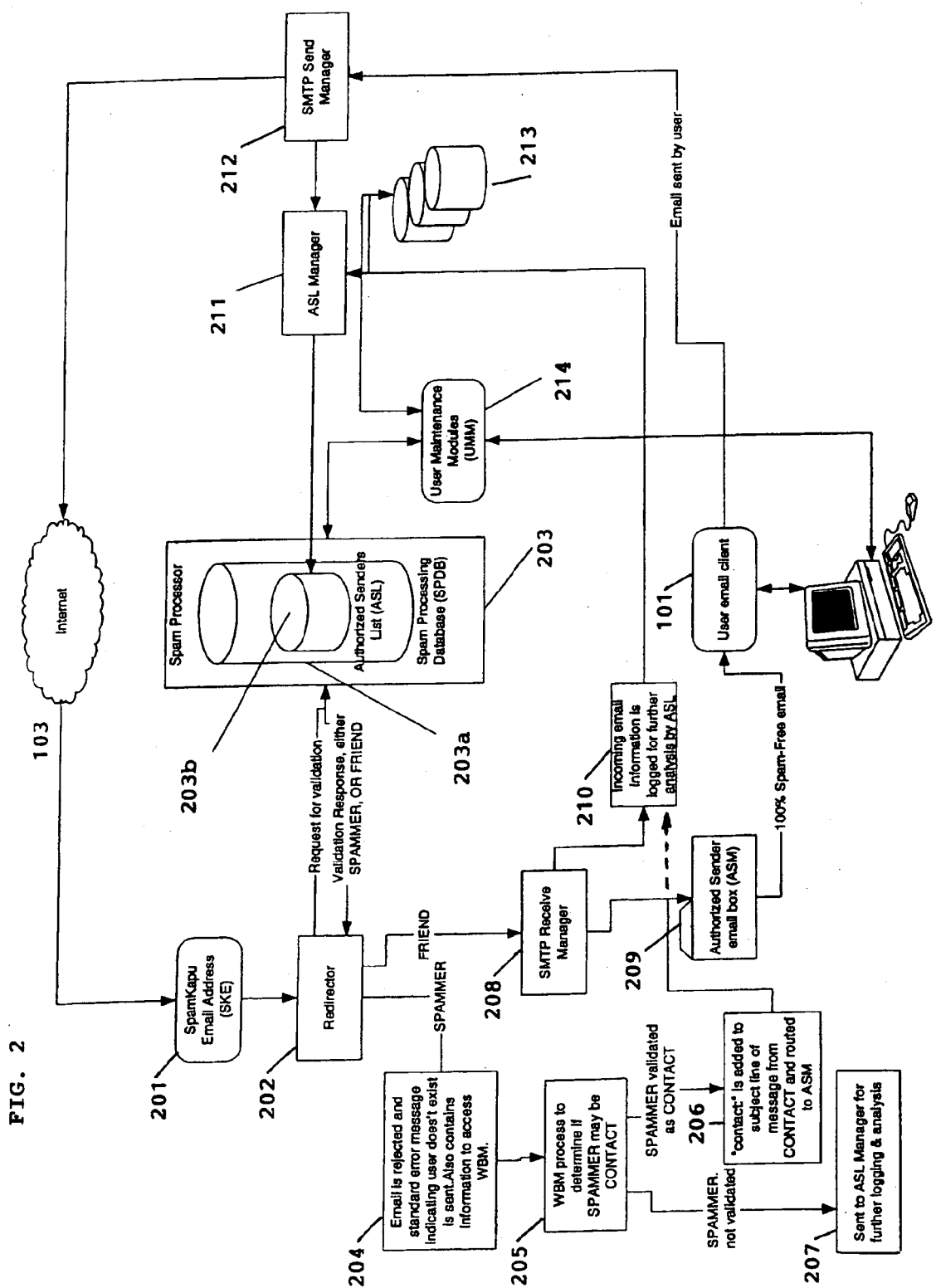
FIG. 2 is a process flow diagram for a preferred embodiment of the anti-spam system of the present invention.

Referring to FIG. 2, the process flow for the operational steps of the anti-spam system of the present invention will now be described. Certain terms used in the description are defined below:

SPAMKAPU: An example of the spam control system of the invention.

SUBSCRIBER: A person subscribing to an ISP email service that is using the spam control system of the invention.

FRIEND: An email-sending source that is authorized by the spam control system to send email to the SUBSCRIBER.

SPAMMER: An email-sending source that is not authorized to send email to the SUBSCRIBER, which is commonly understood to be an unknown or unauthorized party that is using a manual or computerized email list mailing program to send large volumes of emails repetitively through the Internet.

CONTACT: An email-sending source that has been identified by the system as a legitimate correspondent of the SUBSCRIBER is authorized by the system to send email to the SUBSCRIBER.

SUSPECT: An email sending source that has not yet been identified as either a SPAMMER or a CONTACT.

Email sent from the Internet (103) is sent to the email address of the ISP for the SUBSCRIBER, referred to in block 201 as the SpamKapu Email Address (SKE). Received email must first pass through the Redirector 202. The Redirector 202 sends a request for validation for the email from the Spam Processor 203 which maintains the Spam Processing Database (SPDB) 203a, including the Authorized Senders List (ASL) 203b. The SPDB Database and ASL List are the heart of SPAMKAPU, as they contain the lists of persons authorized to send email to the respective SUBSCRIBERS of the system. The Spam Processor 203 sends a response, either that the sender's address on the email is not authorized on the ASL List, i.e., is a SPAMMER, or is authorized on the ASL List, i.e., is a FRIEND. If the response is that it is a SPAMMER, the Redirector 202 rejects the email, as shown at block 204, such as by sending a standard error message to the sending server that the user as addressed does not exist.

As a refinement to the system, a Web-Based Messenger (WBM) process at block 205 may be set up to provide a corrective procedure in the event that the rejected email is from someone not authorized but not listed permanently on the ASL List as a SPAMMER. The unauthorized email may actually be from a person who has not been previously processed in the anti-spam system but who has a legitimate reason to reach the SUBSCRIBER. The WBM process 205 is set up as part of the spam control system to which the rejected email is redirected. Upon receipt of the redirected email, the WBM process stores it in the WBM database, assigning the email a unique ID code and also an expiration date. The WBM process then sends an error response email to the email sender, who is now treated as a SUSPECT. For example, the error message may read:

"An email sent by you to SUBSCRIBER's address was redirected to this site as being sent from an unrecognized sender address which may be a source of spam email. If you would like to confirm yourself as a person with legitimate reason to reach the SUBSCRIBER, please visit the WBM site (or send a reply email) and confirm your status as a CONTACT."

The WBM may have a separate web site address for interactions with SUSPECTS, or it may be set up to receive and recognize email responses from SUSPECTS. When a SUSPECT receives the error response email, if they are a legitimate CONTACT for the SUBSCRIBER, they may elect to go to the WBM site or send a reply email in order to confirm their status as a legitimate CONTACT. If done before the expiration date, the WBM process will add a special codeword such as "contact:" to the subject line of the redirected email, as shown at block 206, and re-route the email to the Authorized Sender Mailbox (ASM) 209. The sender address for email redirected through this process is also stored (as indicated by the dashed line to block 210) and logged for further analysis by the ASL Manager 211, to determine if the status of the SUSPECT should be upgraded to FRIEND and added to the ASL 203b. If the SUSPECT does not respond, this fact is also sent to the ASL Manager for further analysis. The extra confirmation step effectively eliminates SPAMMERS since they use automated programs to send out batch email and typically will not take human response time to log on to the WBM site or send a reply email to confirm their legitimate status.

If the Spam Processor sends a validation response that the sender is a FRIEND, then the Redirector 202 passes the email to the SMTP Receive Manager, at block 208, which performs its administrative function of checking the SUBSCRIBER's status and storing the email in ASM 209, which is the SUBSCRIBER'S Inbox. The user can now collect their email from the ASM Inbox (using standard Internet protocols such as POP3 or IMP4) through the user email client 101 on their computer. Their email is 100% spam-free, since all email from senders not recognized by the system as authorized has been rejected. The SMTP Receive Manager 208 is also configured to log the information of receipt of the email from a FRIEND and send it to the ASL 203b for further analysis, as indicated at block 210.

Users send email composed on and sent from the email client 101 via standard SMTP protocols to the ISP's email server. The ISP's SMTP server is responsible for providing users with email addresses within the system, and sending users' email to the recipients' email addresses on the Internet 103. In the SPAMKAPU invention system, an SMTP Send Manager 212 is provided to intervene in the usual send email process. The SMTP Send Manager 212 copies header information from all outgoing email and sends the data to the ASL Manager 211, then sends the email on to its intended destination. The ASL Manager 211 performs one of the key functions in the invention system. It analyzes the header data from sent email and data from other data sources 213 maintained by the ISP email server system, such as email logs and user-supplied lists. On the basis of its analysis routines (to be described in further detail below), the ASL Manager 211 checks, populates, and updates the SPDB Database and ASL List with the email addresses and other data on senders authorized to send email to the SUBSCRIBERS. The SPAMKAPU system also includes User Maintenance Modules (UMM) 214 which allows the user to interact with and upload user information to SPAMKAPU for further customization of SPAMKAPU's email operations for the user.

Figure 3A:
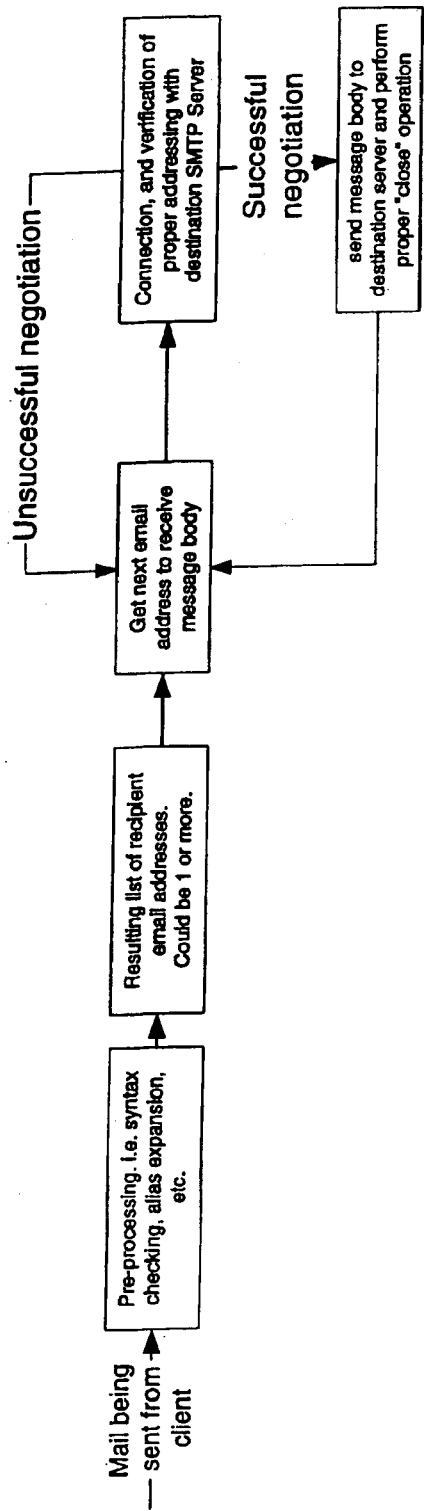
FIG. 3A is a block diagram illustrating a standard SMTP send email process (Prior Art), as compared to FIG. 3B which shows a modified send email process used in the present invention.
Figure 3B:
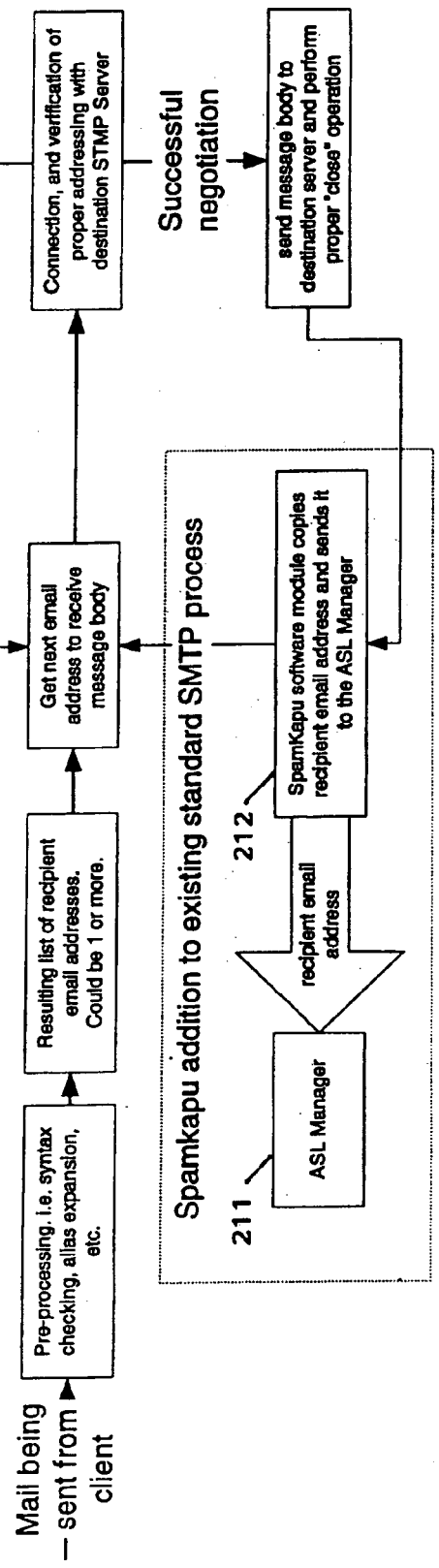

Referring to FIGS. 3A and 3B, a standard SMTP send email process (Prior Art) is is shown compared to a modified send email process used in the present invention. In the standard send email process, in FIG. 3A, email sent from the user's email client to the ISP's email server may be preprocessed, such as checking for correct syntax, alias expansion, etc., and to identify the list of recipient email addresses (could be 1 or more). The server email manager gets each recipient email address in turn and attempts to establish a connection to the destination SMTP server and verify if the recipient email address is proper. If negotiation is unsuccessful, an error message is returned to the sending SMTP server. If negotiation is successful, the sending server sends the message body to the destination server and performs a proper "close connection" operation. In the modified send email process of the invention, in FIG. 3B, the email sent from the client is preprocessed, receipient(s) are identified, and connection(s) with the destination server(s) are attempted as usual. Upon successful negotiation, the SPAMKAPU SMTP Send Manager 212 copies the successful recipient email address(es) and sends the data to the ASL Manager 211. On the assumption that the SUBSCRIBER authorizes email to be received from any person the SUBSCRIBER has sent email to, the proper email addresses of persons to whom the SUBSCRIBER has sent email are added to the ASL List of persons authorized to send email to the SUBSCRIBER. The sent email data can be used in further analyses by the ASL Manager, e.g., to upgrade a person's authorized status from temporary to permanent if more than a threshold number of email is sent by the SUBSCRIBER to the same person.

Figure 4A:
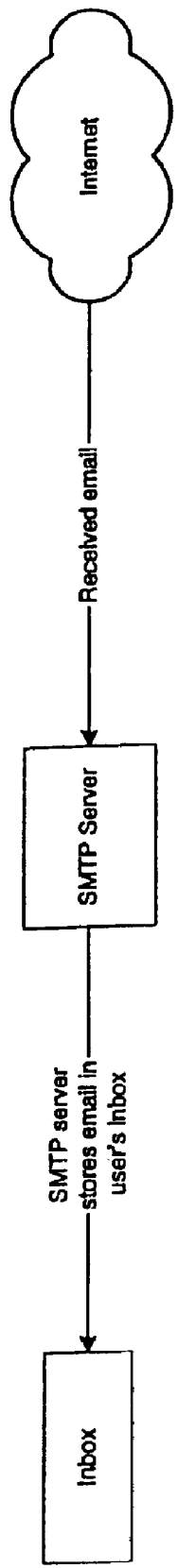
FIG. 4A is a block diagram illustrating a standard SMTP receive email process (Prior Art), as compared to FIG. 4B which shows a modified receive email process used in the present invention.
Figure 4B:
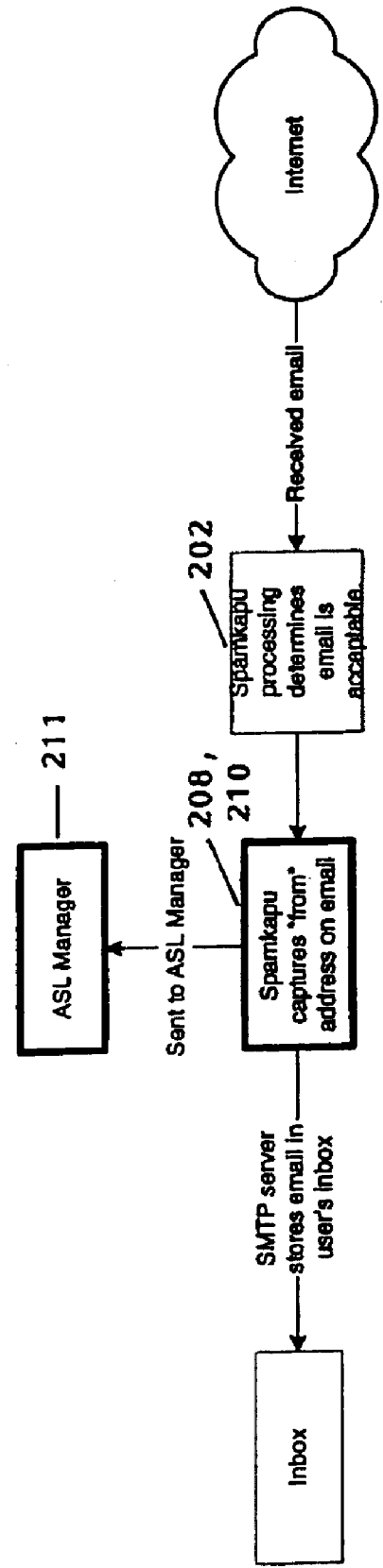

Referring to FIGS. 4A and 4B, a standard SMTP receive email process (Prior Art) is shown compared to a modified receive email process used in the present invention. In the standard receive email process, in FIG. 4A, email is received by the SMTP server from sender sources on the Internet and the server stores the email in the user's Inbox. In the modified receive email process of the invention, in FIG. 4B, the received email is subjected to processing by the Redirector 202 to determine if the sender's address is that of an authorized person on the ASL List. If authorized, the SMTP server stores the email in the user's Inbox after the SMTP Receive Manager 208 captures the sender's address on the email in the address log step 210 to be sent to the ASL Manager 211. Even through the sender is already on the ASL authorized persons list, the received email data can be used in further analyses by the ASL Manager, e.g., to upgrade a persons authorized status from temporary to permanent if email from that person is received on an ongoing basis and has not been changed by the user.

Figure 5:
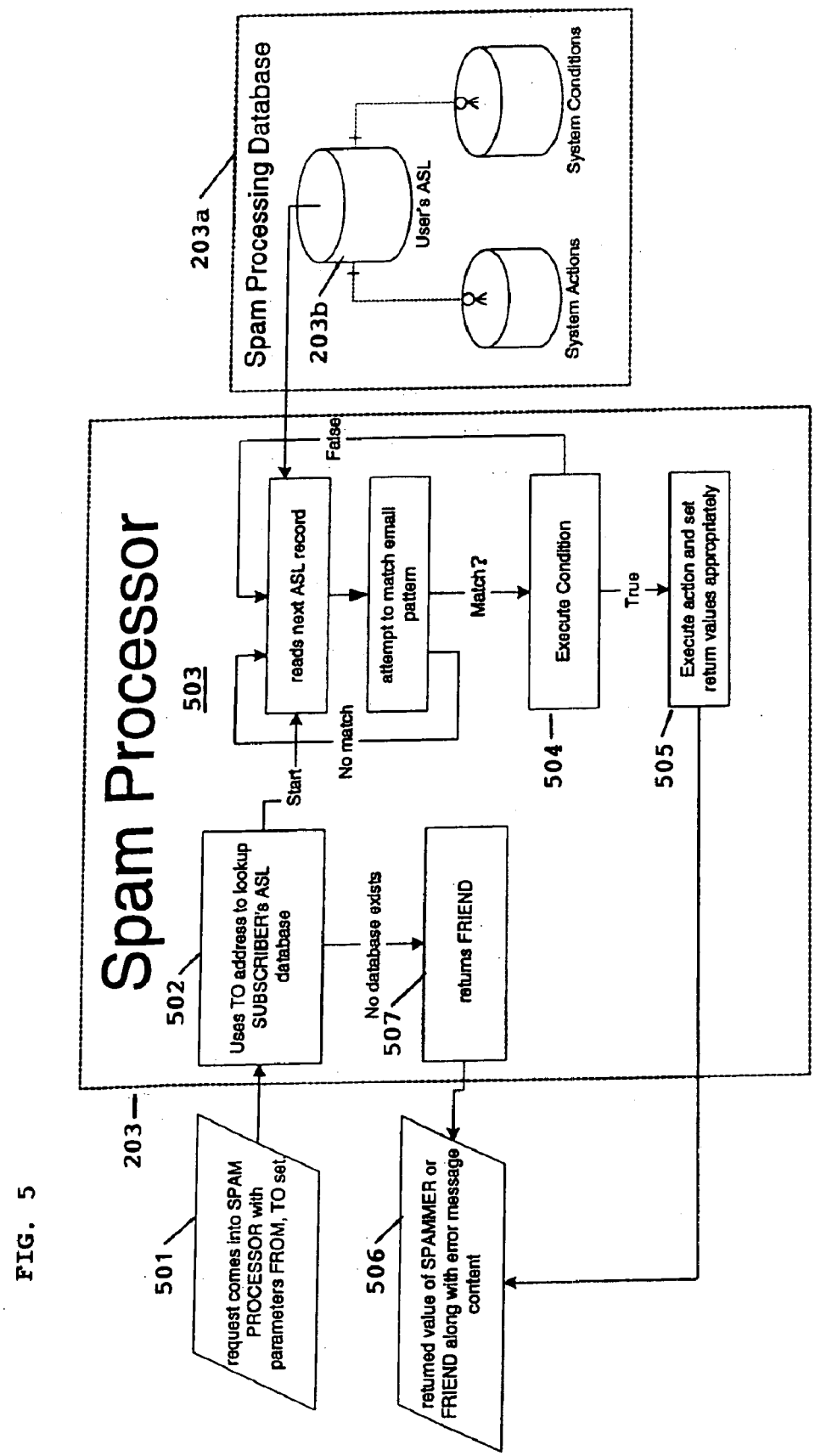
FIG. 5 is a process flow diagram illustrating the operation of an anti-spam processing routine in the preferred embodiment of the invention.

In FIG. 5, a process flow diagram illustrates the operation of the Spam Processor 203. At block 501, a request from the calling routine, here Redirector 202, seeks validation whether a received email is from an authorized sender. The request identifies the parameters who the email is FROM and who it is sent TO. The Spam Processor 203 uses the TO address to lookup that user's ASL list 203*b* in the SPDB Database 203*a*, as indicated at block 502. The lookup procedure follows a loop 503 of reading the next ASL record on the user's ASL list, checking for a match to the email FROM address (authorized person), reading the next record if there is no match of the current record, executing the match condition by issuing a TRUE value if found, otherwise returning for the next record, as indicated at block 504. At block 505, if a TRUE VALUE is issued, then at block 505 the action is taken of setting the output value to FRIEND or SPAMMER as specified by the ASL table (described in further detail below) along with any appropriate error message(s) to be returned. At block 506, the returned value is sent as a message to the calling routine, i.e, the Redirector 202. As a default option, if no ASL list is found for the user, the system returns the value FRIEND, as indicated at block 507, in order to allow the email to be accepted as a temporary condition until an ASL list can be established for that user. The request processing routine can be implemented using industry standard PERL programming syntax and incorporating a PERL interpreter to execute the processing rules.

Figure 6:
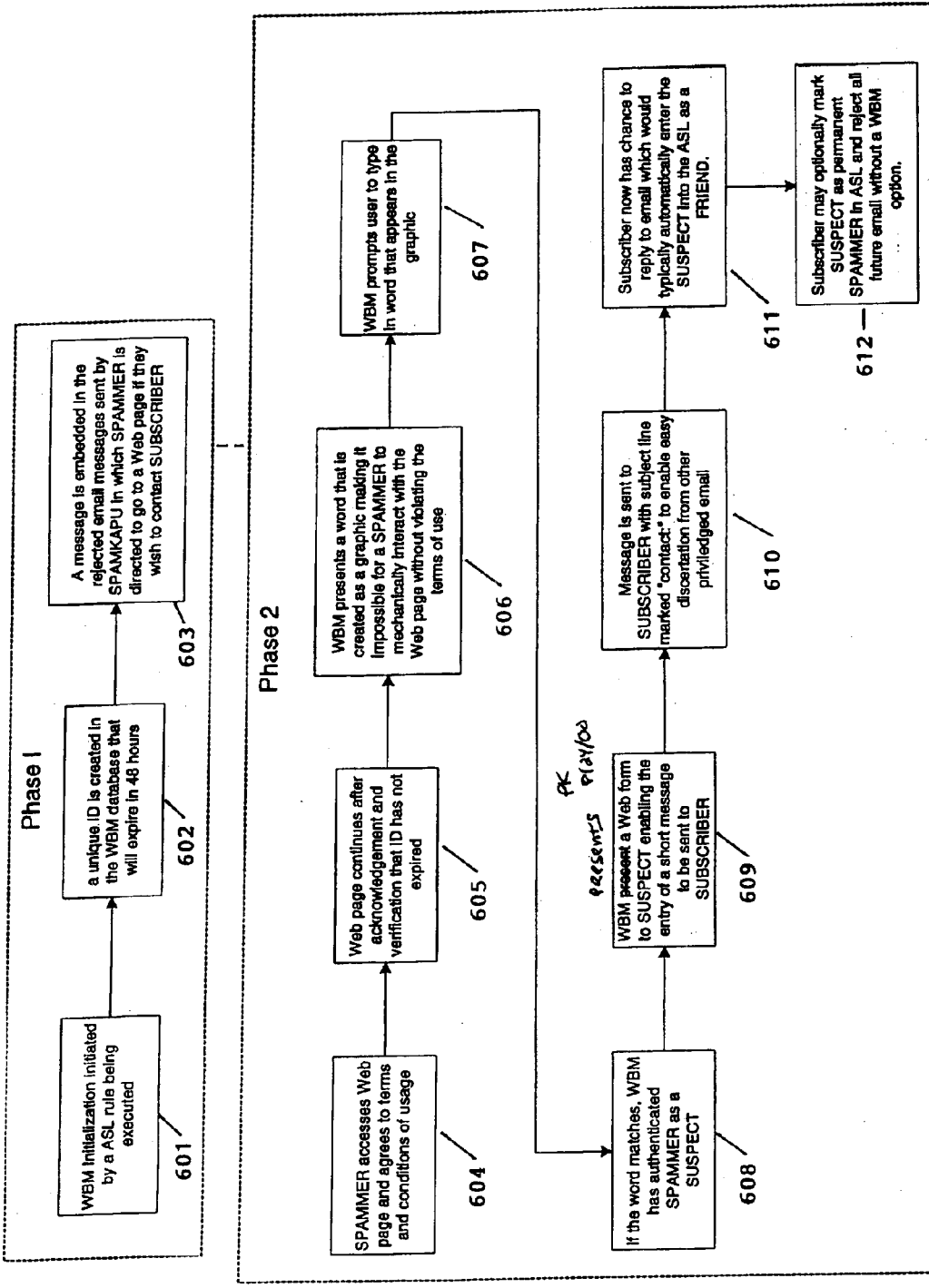
FIG. 6 is a process flow diagram illustrating the detailed operation of a Web-Based Messenger (WBM) routine for handling email initially rejected by the anti-spam control.

In FIG. 6, a process flow diagram illustrates the detailed operation of the Web-Based Messenger (WBM) routine for handling email rejected by the Redirector 202 (see FIG. 2). Preferably, the WBM process is implemented via interaction with a rejected sender at a separate Web site address. In Phase 1, corresponding to step 204 in FIG. 2, the WBM process is initialized at block 601 by the ASL rule returning a value for rejecting an email as sent from a SPAMMER by the Redirector 202. At block 602, a unique ID number is gin the WBM database and a given expiration date is set, e.g., 48 hours. At block 603, a return message is added along with the unique ID code to the body of the SPAMMER's email and sent back to the sender's email address in order to notify the SPAMMER to go to the WBM web page if they wish to follow through with contacting the SUBSCRIBER. The WBM then waits for the SPAMMER to go to the WBM site to complete the process, referred to as Phase 2. At block 604, the SPAMMER accesses the WBM web site and agrees to the displayed terms and conditions of usage. At block 605, the WBM process verifies that the time for response for the email corresponding to the ID number has not expired. The WBM then follows a test procedure to ensure that the responding SPAMMER is not being implemented by a mechanical program. For example, at block 606, a word stylized in non-standard font can be displayed as a graphic image, and at block 607 the SP MER is prompted to type the word that appears in the graphic. A mechanical program would not be able to read a graphic image of a word in unrecognizable font. At block 608, if the WBM process determines that a correct word has been typed, the SPAMMER's status is upgraded to SUSPECT on the users ASL list. At block 609, the WBM process presents a form to enable the SUSPECT to enter a short message to be sent to the SUBSCRIBER. For example, the SUSPECT can ask the SUBSCRIBER to make sure the anti-spam control has been updated to allow email. At block 610, the email and message is sent, by routing directly to the ASM email box for the SUBSCRIBER, along with modification of the header to include a codeword or flag, e.g., adding the word "contact:" to the subject line. The codeword can be discerned in the ASM email logging step 210 in FIG. 2, in order to differentiate the redirected email from other email determined to be authorized email. At block 611, the SUBSCRIBER can now read the SUSPECT's email. If the SUBSCRIBER sends a reply to the email, the SUSPECT's status may be automatically upgraded to FRIEND, or the SUBSCRIBER may upgrade the status to FRIEND manually by interaction with the ISP email server through the UMM 214. At block 612, if the SUBSCRIBER determines that the email is from someone whose email should be rejected without a WBM error reply option, the SUBSCRIBER may optionally downgrade the status permanently to SPAMMER through the UMM 214.

Figure 7A:
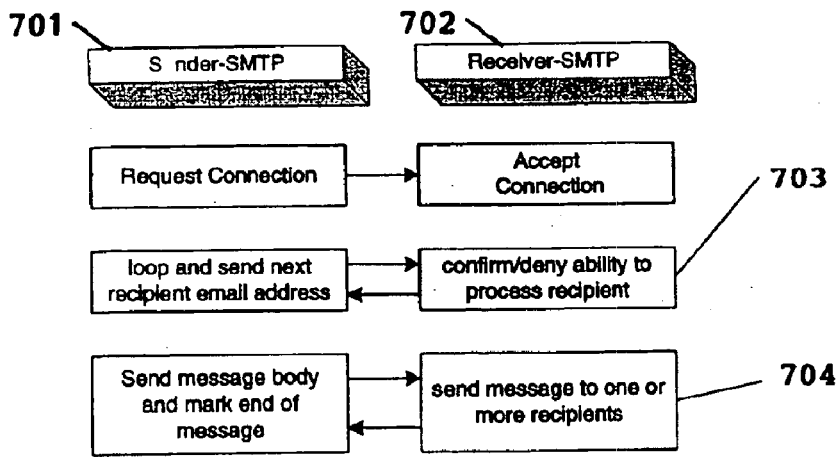
FIG. 7A is a block diagram illustrating a standard SMTP send-receive email handling process (Prior Art), as compared to FIG. 7B which shows a modified Redirector process for handling received email.
Figure 7B:
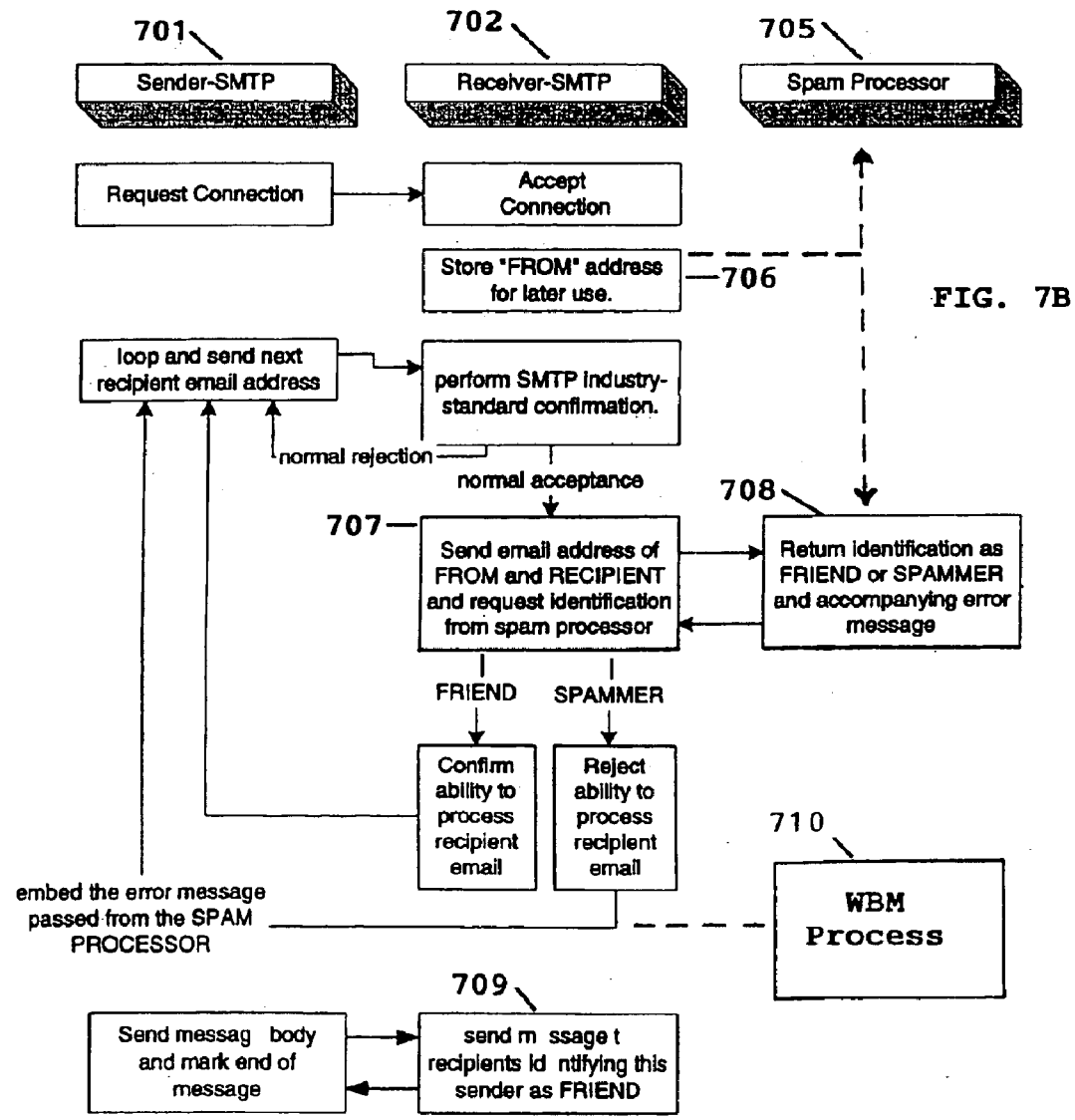

Referring to FIG. 7A, a block diagram illustrates a standard SMTP send-receive email handling process (Prior Art), as compared to FIG. 7B which shows a modified Redirector process for handling received email. In the standard process, the Sender-SMTP 701 requests connection to the Receiver-SMTP 702, which accepts the connection if available. The Sender SMTP then performs the task in its Send Email loop of sending the receipient's email address. At block 703, the Receiver-SMTP confirms or denies whether the recipient exists or whether it has authority to process email for this user. If confirmed, the Sender-SMTP sends the message body and marks the end of the message. At block 704, the Receiver-SMTP receives the message body and sends it to the email box of the recipient (or recipients if the message is sent to more than one recipient at that SMTP server address.

In FIG. 7B, the Sender-SMTP 701 and Receiver-SMTP 702 perform their usual establishing of a connection and check for valid receipient e-mail address. However, in this modified process implemented in conjunction with the Spam Processor 705, the sender's FROM address is stored by the Spam Processor for later use, as indicated at block 706. At block 707, the sender's FROM address and the recipient's TO address are sent to the Spam Processor 705, by a request for validation by the Redirector as described previously. At block 708, after checking the recipient's ASL list to determine whether the sender is authorized, the Spam Processor can return a response of FRIEND or a response of SPAMMER with an accompanying error message. If the response is FRIEND, an output is sent to the Sender-SMTP confirming that the email can be received, and the email is sent to the Receiver-SMTP as usual. At block 709, the Receiver-SMTP puts the email in the recipient's email box and, if desired, can include a message noting that the sender was identified on the ASL list as a friend. If the response is SPAMMER, then an error message is returned to the Sender-SMTP that the recipient does not exist or the Recipient-SMTP is not authorized to accept the email. Optionally, the Receiver-SMTP may send the email through the WBM process, as described previously (indicated at block 710), if the response from the Spam Processor indicates that the status of the sender is an unknown sender (as opposed to having the confirmed status of SPAMMER).

Figure 8:
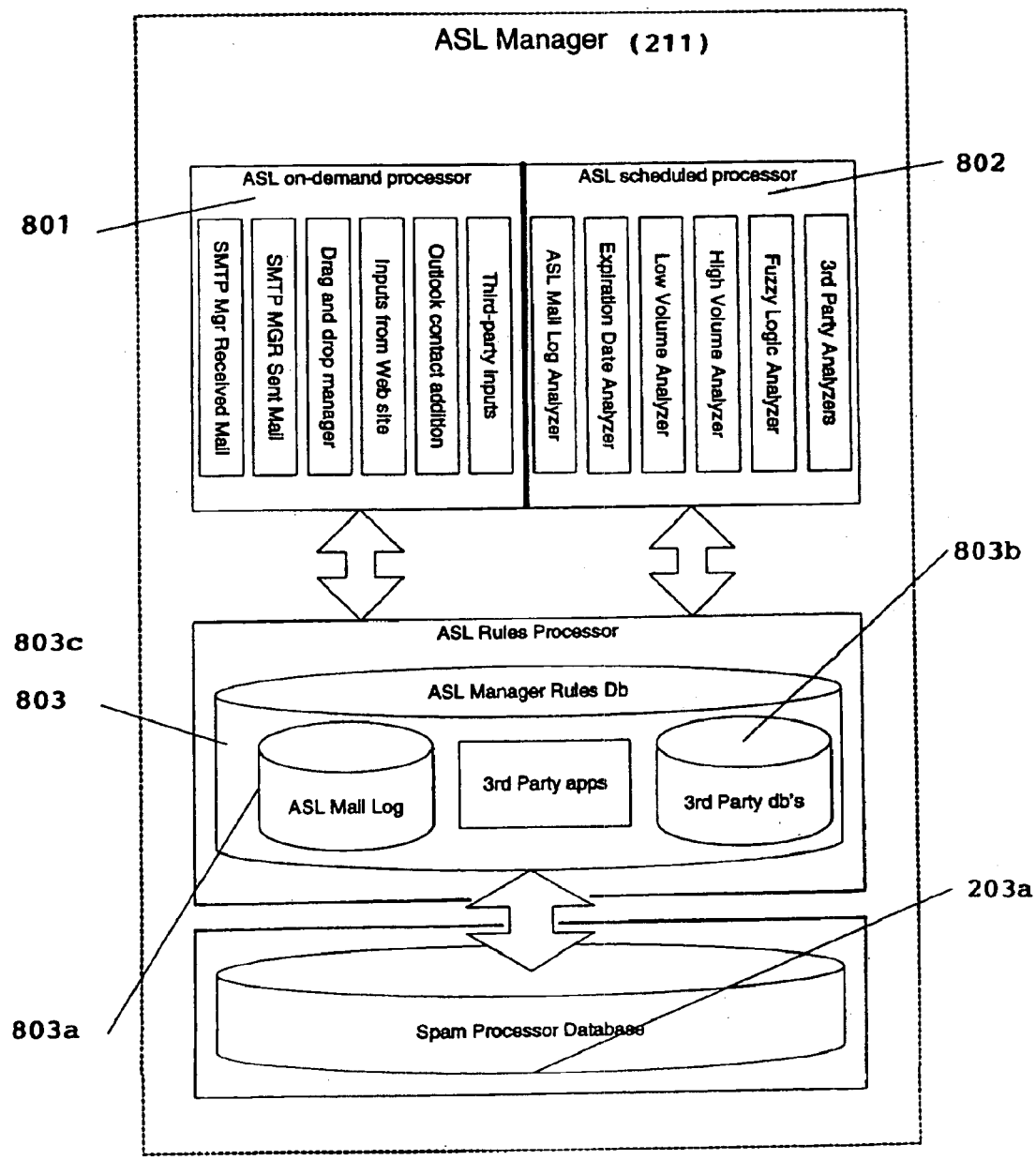
FIG. 8 is a schematic diagram illustrating the structure and operation of the ASL Manager in the preferred embodiment of the spam control system.

In FIG. 8, a schematic diagram illustrates the structure and operation of the ASL Manager, previously described as component 211 with respect to FIG. 2. The ASL Manager preferably is structured to have an ASL On-Demand Processor 801 and an ASL Scheduler Processor 802, both of which interact with an ASL Rules Processor 803, which also exchanges data with the Spam Processor Database (SPDB) 203*a*. Email addresses sent to and received from the SMTP Send Manager 212 and SMTP Receive Manager 208 are processed by the ASL On-Demand Processor 801 which executes the appropriate rules in conjunction with the ASL Rules Processor 803. Content from a variety of other sources, including compatible third party plug-ins, can also be processed to create, populate, and update the ASL Lists stored in the SPDB 203*a*. For example, content may be received from a "Drag and Drop Manager" for conveniently handling user address inputs while working with the email client, user address inputs from Web sites while working with an associated browser, addresses added by the user to a desktop contact manager, such as the Microsoft Outlook™ Address Book, or other contact lists, and other address inputs generated by third party software that can operate with the user's client programs.

The ASL Scheduler Processor 802 is used to process tasks on a scheduled basis for various analysis and maintenance functions. This allows a very rich examination of the SUBSCRIBER's ASL list, mail log, and other data files, to continually refine the "authorized senders" list for accuracy and relevance. For example, the processor functions can include: an ASL Mail Log Analyzer for analyzing the ASL Mail Log database 803*a* of the SUBSCRIBER's received and sent emails; an Expiration Date Analyzer for setting and enforcing expiration dates for authorized senders to be re-authorized; a Low Volume Analyzer for downgrading or eliminating the authorization status of senders with whom the SUBSCRIBER communicates very infrequently; a High Volume Analyzer for upgrading or permanently marking the authorization status of senders with whom the SUBSCRIBER communicates very frequently; a Fuzzy Logic Analyzer for making qualitative decisions as to FRIEND or SPAMMER status based on a variety of factors; and other Third Party Analyzers for analyzing data generated by third party plug-ins and programs to refine the ASL list.

The ASL Rules Processor 803 contains the rules (in an ASL Manager Rules Database) that determine how to add, update or modify the ASL Lists maintained in the SPDB Database 203*a*. The Rules Processor can have an architecture that readily accepts and inter-operates with third party databases 803*b* and applications programs 803*c* in order to harness the collective power of developers in the network communications industry to continually improve and extend the SPAMKAPU system's feature set. The ultimate result of this architecture is to enable the creation of a very richly detailed ASL database which goes beyond even the total elimination of spam email into other or future needs of users for the dynamic and intelligent handling of email.

Figure 9:
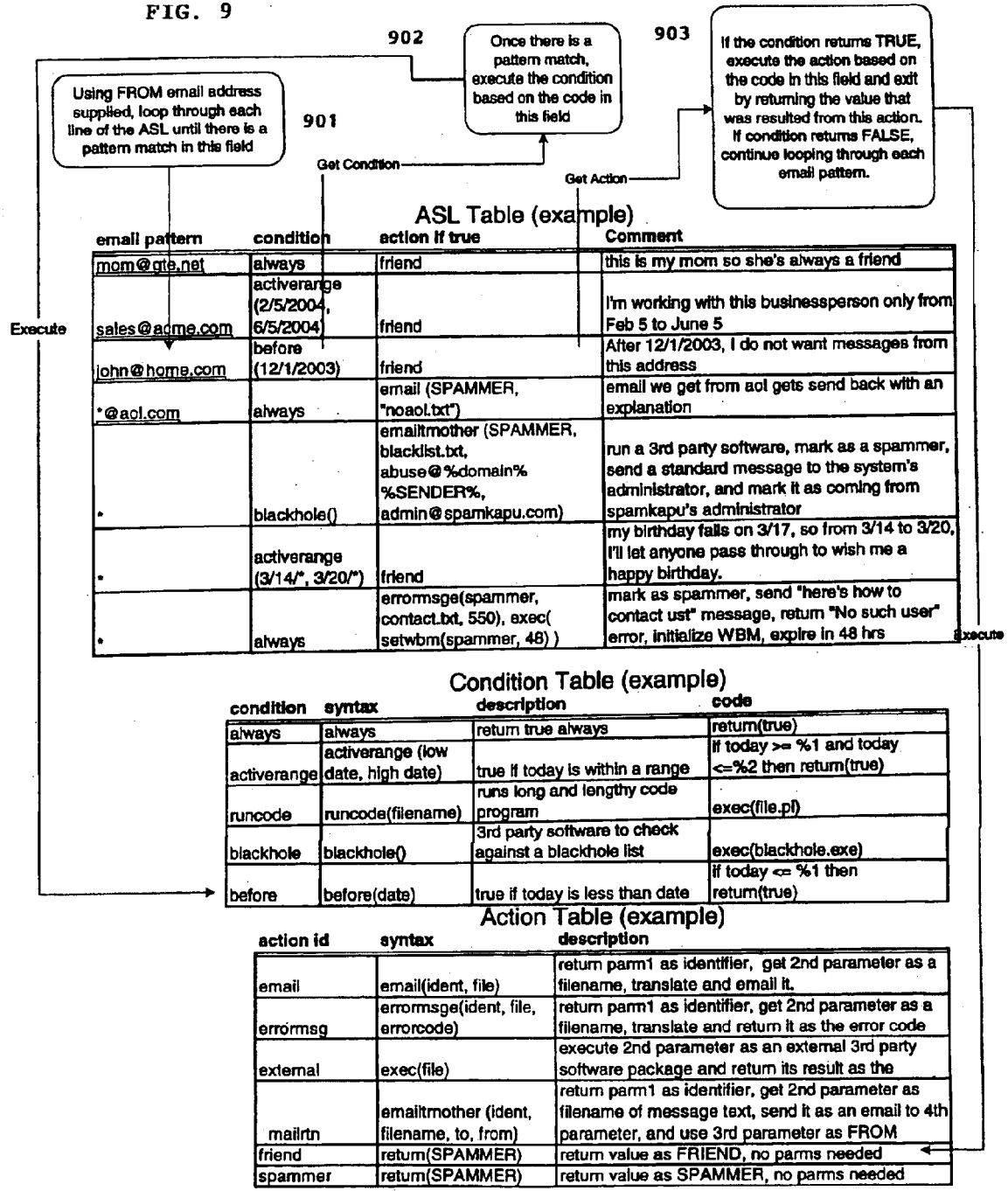
FIG. 9 illustrates a detailed implementation of examples of processing of email send/receive and user contact data into specific forms of actions taken by the ASL Manager.

In FIG. 9, a detailed implementation is illustrated of examples of processing of email send/receive and user contact data into specific forms of actions taken by the ASL Manager. The basic process flow consists of: Step 901 of looping through each line of an ASL list (called a Table) comparing the FROM address captured from an incoming email for a match; Step 902 of determining whatever condition or status flag has been set for the matched entry, then executing the corresponding condition rule as maintained on the Condition Table, resulting in return of a Return Value; and Step 903, based on the Return Value, executing the corresponding action rule as maintained on the Action Table, and exiting with a Final Return Value from this action. To follow one example through this process flow, Step 901 finds a FROM match of the sender address john@home.com, Step 902 notes the expiration date condition "before Dec. 1, 2003" and executes the "before" condition on the Condition Table to return a value of "True" if today's date isless than the indicated expiration date, and Step 903 notes that the sender status action (if condition is True) is "friend" and executes the "friend" action on the Action Table to return a Final Return Value of FRIEND (no parameters needed) as the validation response of the Spam Processor.

The specific programming syntax or execution logic of the ASL Manager rules processing may be varied in any suitable manner depending on the developer of the Spam Processor application. The following examples of some options for ASL Manager actions illustrate a wide range of approaches that may be used:

MATCHING AN EMAIL ADDRESS OR ADDRESS PATTERN:
 (a) Default: exact match
 (b) A specific email address: john@company.com
 (c) UNIX Standard wildcard matching:
   microsoft.com=anything from "Microsoft.com"
   microsoft*=anything with microsoft in it
   .mil=any email from the military
 (d) Matching any known "blackhole list" by using a % BLACKHOLE % symbol.

USING A CONDITIONAL AND PARAMETERS TO EXECUTE IF THE MATCH IS TRUE

USING A SECONDARY ACTION AND PARAMETERS TO PERFORM IF THE CONDITIONAL IS TRUE.

USING THE LAST DATE THE SUBSCRIBER SENT EMAIL TO THIS ADDRESS

USING THE LAST DATE THIS ADDRESS SENT EMAIL TO THE SUBSCRIBER

USING DATE THE RECORD WAS CREATED

EXAMPLES OF CONDITIONALS THAT CAN BE USED:
 (a) Expiration dates: use a given address until Feb. 12, 2004
 (b) Date ranges: use a given address from Apr. 1, 2004 to May 2, 2004
 (c) Specific recurring times: first week of every month but no other time, e.g., newsletter@magazine.com acceptable during $1^{st}$ week of each month.
 (d) A link to external software designed to allow for additional user-defined criteria; this allows for third party applications

EXAMPLES OF MESSAGES THAT MAY BE INVOKED BY A GIVEN SECONDARY ACTION (a) Standard "error"
(b) Custom with variable substitution in the message body, e.g.:
  % username % is substituted with the sender's email address
  % subid % is the ID code of the subscriber
  % date % is today's date
(c) "hello % username % you have been identified as spam, go to http://www.spamkapu.com/subscriber % subid % and if you're really human we'll let you in.
(d) Custom text: "All email addresses from America Online are unconditionally rejected"
(e) Send a given message in the error response.
(f) Send a given message as an email.
(g) Open a file and email its contents
(h) Open a file and send its contents as an error reponse.
(i) Set the sender's status to SPAMMER or FRIEND
(j) Create a unique ID that will expire after a short time period (24–48 hrs). This id can be used by the SUSPECT to access the WBM and become a CONTACT.
(k) Give SMTP default error message
(l) Link and execute external software designed to allow for additional user-defined actions; this allows for third party applications.

In summary, the present invention provides a spam email rejection method which analyzes the sender address of incoming email and determines whether it is to be rejected or accepted depending upon managed lists of authorized senders. This is a significant departure from existing anti-spam processing systems which accept all email and attempts to filter out only those that have sender addresses recognized as those of known spammers. The invention method does not filter out unauthorized email, rather it rejects all email unless authorized. The ASL Manager in the system captures and analyzes sender and recipient usage patterns for outgoing and incoming email in order to refine the "authorized senders" lists. The analysis of this data provides a rich foundation for rules-based decisions as to which sender addresses are considered SPAMMER and which are not. This data creates an "authorized sender" list of FRIENDS, as opposed to a list of known SPAMMERS, thereby ensuring that no unsolicited or uninvited email will ever pass through to the SUBSCRIBER's email box.

It is understood that many other modifications and variations may be devised given the above description of the guiding principles of the invention. It is intended that all such modifications and variations be considered as within the spirit and scope of this invention, as defined in the following claims.

I claim:

1. A method for eliminating unauthorized email on a network comprising the steps of:
  (a) establishing a connection on a network between an email-receiving server and an email-sending server, wherein said email-receiving server and email-sending server utilize a common email-sending system protocol to send email on the network;
  (b) making accessible to the email-receiving server for each subscribing user an authorized senders list (ASL list) of email addresses of senders authorized to send email to the user,
  (c) receiving at the email-receiving server, under the common email-sending system protocol a message from the email-sending server requesting to send email which is addressed to a user deemed to receive email through the email-receiving server and which is addressed from a given sender address;
  (d) causing the email-receiving server to check whether the user the intended email is addressed to is a user which receives email through the email-receiving server, and, if so, then causing the email-receiving server to check whether the sender address of the intended email is on the user's ASL list; and
  (e) if the sender address of the intended email is recognized as being on the user's ASL list, causing the email-receiving server under the common email-sending system protocol to send a reply message to the email-sending server that the sending of the email to the email-receiving server will be accepted, otherwise if the sender address of the intended email is not recognized as being on the user's ASL list, causing the email-receiving server to send an error message, under the common email-sending system protocol, to the email-sending server so as to prohibit the email-sending server from sending the intended email to the email-receiving server, whereby the sender is unable to send the unwanted email to the user and is deterred from sending further email to the user's address indicated to be in error by the email-receiving server.

2. A method according to claim 1, wherein the ASL module includes an ASL database for storing ASL lists of authorized sender addresses for respective users of the email-receiving server, a spam processor module for checking the ASL lists for matches, and an ASL manager for creating, maintaining, and updating the ASL lists.

3. A method according to claim 1, wherein a redirector module is provided to operate with the ASL module for receiving the message from the email-sending server requesting to send mail designating the sender's address and intended recipient's address, for sending a request for validation to the spam processor module to determine whether the sender's address matches any authorized sender address maintained on the ASL list corresponding to the address of the intended recipient, for sending the reply message accepting the email from the email-sending server ifs match to an authorized sender address is found, and for sending the error message not accepting the email if no match to an authorized sender address is found on the ASL list.

4. A method according to claim 3, wherein a web-based messaging (WBM) module is provided to which the sender of intended email that is not accepted by the email-receiving server is redirected by the redirector module, and wherein the WBM module sends a message to the address of the sender of the non-accepted email notifying the sender to confirm with the WBM module that the sender is a legitimate sender of email to the intended recipient.

5. A method according to claim 4, wherein the WBM module is a website accessible on the network which invites the notified sender to log on and confirm that the sender is a legitimate sender of email through an interaction procedure which can only be performed by a human.

6. A method according to claim 5, wherein the interaction procedure includes a display of a graphic image of a word in a non-standard font, and a prompt to the sender to enter in a word corresponding to the graphic image of the word, whereby the system can confirm that the interaction procedure is not performed by a mechanical program.

7. A method according to claim 4, wherein once the sender is confirmed as a legitimate sender of email to the intended recipient user, the WBM website sends a message to the redirector module at the users email-receiving server that the sender is confirmed as a legitimate sender by the WBM website.

8. A method according to claim 2, wherein email addresses used on email sent by a user which receives email through the email-receiving server and other addresses accessed by the user on the network are captured and stored with the ASL manager for later analysis.

9. A method according to claim 8, wherein the ASL manager analyzes the captured addresses using a rules processor for processing predefined address capture rules for updating the ASL lists using data from an email address source selected from the group of email address sources consisting of: received email; sent email; user inputs to email service function on the email client; inputs from user browsing of web sites; user desktop organizer and other contact ists; and third party address program inputs.

10. A method according to claim 8, wherein the ASL manager analyzes the captured addresses using a rules processor for processing predefined analysis rules for updating the ASL lists using data from an analysis source selected from the group of analysis sources consisting of: user email log analysis; expiration date analysis; low/high email volume analysis; fuzzy logic analysis; and third party data analysis.

11. A method according to claim 2, wherein the ASL manager maintains the ASL lists to designate a sender-address status for each sender address selected from the group of sender-address statuses consisting of: always authorized as a friend; authorized as a friend over a date range; authorized as a friend before an expiration date; always rejected as a spammer; rejected as a spammer matching a black list; and rejected as a spammer sent with an error message.

12. A method for eliminating unauthorized email on a network comprising the steps (a) establishing a connection on a network between an email-receiving server and an email-sending server, wherein said email-receiving server and email-sending server utilize a common email-sending system protocol to send email on the network;

(b) making accessible to the email-receiving server for each subscribing user an authorized senders list (ASL list) which identifies email addresses of senders not authorized to send email to the user;

(c) receiving at the email-receiving server, under the common email-sending system protocol, a message from the email-sending server requesting to send mail which is addressed to a user deemed to receive email through the email-receiving server and which is addressed from a given sender address;

(d) causing the email-receiving server to check whether the user the intended email is addressed to is a user which receives email through the email-receiving server, and, if so, then causing the email-receiving server to check whether the sender address of the intended email is on the user's ASL List of senders not authorized to send email to the user; and (e) if the sender address of the intended email is recognized as being on the user's ASL list, causing the email-receiving server under the common email-sending system protocol to send a reply message to the email-sending server that the sending of the email to the email-receiving server will be accepted, otherwise if the sender address of the intended email is recognized as being not authorized on the user's ASL List, causing the email-receiving server to send an error message, under the common email-sending system protocol, to the email-sending server so as to prohibit the email-sending server from sending the intended email to the email-receiving server, whereby the sender is unable to send the unwanted email and is deterred from sending further email to the user's address indicated to be in error by the email-receiving server.

13. A method according to claim 12, wherein the ASL module includes an ASL database for storing ASL lists of both authorized and non-authorized sender addresses for respective users of the email-receiving server, a spam processor module for checking the ASL lists for matches, and an ASL manager for creating, maintaining, and updating the ASL lists.

14. A method according to claim 12, wherein a redirector module is provided to operate with the ASL module for receiving the message from the email-sending server requesting to send email designating the sender's address and intended recipient's address, for sending a request for validation to the spam processor module to determine whether the senders address matches any authorized sender address maintained on the ASL list corresponding to the address of the intended recipient, for sending the reply message accepting the email from the email-sending server if a match to an authorized sender address is found, and for sending an error message not accepting the email if no match to an authorized sender address is found on the ASL list.

15. A method according to claim 14, wherein a web-based messaging (WBM) module is provided to which the sender of intended email that is not accepted by the email-receiving server is redirected by the redirector module, and wherein the WBM module sends a message to the address of the sender of the non-accepted email notifying the sender to confirm with the WBM module that the sender is a legitimate sender of email to the intended recipient.

16. A method according to claim 13, wherein once the sender is confirmed as a legitimate sender of email to the intended recipient user, the WBM website sends a message to the redirector module at the user's email-receiving server that the sender is confirmed as a legitimate sender by the WBM website.

17. A method according to claim 13, wherein email addresses used on email sent by a user which receives email through the email-receiving server and other addresses accessed by the user on the network are captured and stored with the ASL manager for later analysis, and wherein the ASL manager analyzes the captured addresses using a rules processor for processing predefined address capture rules for updating the ASL lists using data from an email address source selected from the group of email address sources consisting of: received email; sent email; user inputs to email service functions on the email client; inputs from user browsing of web sites; user desktop organizer and other contact lists; an third party address program inputs.

18. A method according to claim 13, wherein email addresses used on email sent by a user which receives email through the email-receiving server and other addresses accessed by the user on the network are captured and stored with the ASL manager for later analysis, and wherein the ASL manager analyzes the captured addresses using a rules processor for processing predefined analysis rules for updating the ASL Lists using data from an analysis source selected from the group of analysis sources consisting of;. user email log analysis; expiration date analysis; low/high email volume analysis; fizzy logic analysis; and third party data analysis.

19. A method according to claim 13, wherein the ASL manager maintains the ASL lists to designate a sender-address status for each sender address selected from the group of sender-address status consisting of always authorized as a friend; authorized as a friend over a date range; authorized as a friend before an expiration date; always rejected as a spammer, rejected as a spammer matching a black list; and rejected as a spa ner sent with an error message.

20. A system for eliminating unauthorized email on a network comprising:
(a) first means for establishing a connection on a network between an email-receiving server and an email-sending server, wherein said email-receiving server and email-sending server utilize a common email-sending system protocol to send email on the network;
(b) second means for making accessible to the email-receiving server for each subscribing user an authorized senders list (ASL list) for identifying which email addresses of senders are authorized to send email to the user;
(c) third means for receiving at the email-receiving server, under the common email sending system protocol, a message from the email-sending server requesting to send email which is addressed to a user deemed to receive email through the email-receiving server and which is addressed from a given sender address; and
(d) fourth means for causing the email-receiving server to check whether the user the intended email is addressed to is a user which receives email through the email-receiving server, and, if so, then causing the email-receiving server to check whether the sender address of the intended email is on the user's ASL list as being authorized to send email to the user,
(e) wherein, if the sender address of the intended email is recognized as being authorized on the user's ASL list, said fourth means causing the email-receiving server to send a reply message, under the common email-sending system protocol, to the email-Sending server that the sending of the email to the email-receiving server will be accepted, otherwise if the sender address of the intended email not authorized on the user's ASL list, said fourth means causing the email-receiving server to send an error message, under the common email-sending system protocol, to the email-sending server so as to prohibit the email-sending from sending the intended email to the email-receiving server, whereby the is usable to send the unwanted email and is deterred from sending further email to the user's address indicated to be in error by the email-receiving server.

* * * * *